(12) United States Patent
Sakuma et al.

(10) Patent No.: US 11,971,571 B2
(45) Date of Patent: Apr. 30, 2024

(54) OPTICAL FIBER

(71) Applicant: SUMITOMO ELECTRIC INDUSTRIES, LTD., Osaka (JP)

(72) Inventors: Hirotaka Sakuma, Osaka (JP); Yuki Kawaguchi, Osaka (JP); Masato Suzuki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/798,589

(22) PCT Filed: Feb. 18, 2021

(86) PCT No.: PCT/JP2021/006199
§ 371 (c)(1),
(2) Date: Aug. 10, 2022

(87) PCT Pub. No.: WO2021/167019
PCT Pub. Date: Aug. 26, 2021

(65) Prior Publication Data
US 2023/0101392 A1 Mar. 30, 2023

(30) Foreign Application Priority Data
Feb. 21, 2020 (JP) ................. 2020-028324

(51) Int. Cl.
*G02B 6/028* (2006.01)
(52) U.S. Cl.
CPC ................. *G02B 6/0281* (2013.01)
(58) Field of Classification Search
None
See application file for complete search history.

(56) References Cited

U.S. PATENT DOCUMENTS

2003/0056549 A1 3/2003 de Sandro et al.
2005/0180709 A1 8/2005 Park et al.
(Continued)

FOREIGN PATENT DOCUMENTS

EP 3012235 A2 4/2016
JP 2016-081067 A 5/2016
(Continued)

OTHER PUBLICATIONS

Libert, JF et al., "The New 160 Gigabit WDM Challenge For; Submarine Cable Systems," International Wire & Cable Symposium Proceedings, 1998, pp. 375-383.
(Continued)

*Primary Examiner* — Chris H Chu
(74) *Attorney, Agent, or Firm* — Faegre Drinker Biddle & Reath LLP

(57) ABSTRACT

An optical fiber according to an embodiment has a structure capable of reducing an increase in transmission loss. The optical fiber includes a glass part extending in a direction of a central axis, and the glass part is comprised of silica-based glass, includes a core and a cladding, and has residual stress approximately uniform throughout a cross section of the glass part orthogonal to the central axis, the core having the central axis and being doped with chlorine with a mass fraction of 1% or more, the cladding surrounding the core and having a refractive index lower than a maximum refractive index of the core.

14 Claims, 16 Drawing Sheets

(56) References Cited

U.S. PATENT DOCUMENTS

| | | | |
|---|---|---|---|
| 2014/0056596 A1 | 2/2014 | Nakanishi et al. | |
| 2014/0137604 A1* | 5/2014 | Nakanishi | G02B 6/02366 65/435 |
| 2016/0109651 A1* | 4/2016 | Borel | C03B 37/01869 65/435 |
| 2016/0304392 A1* | 10/2016 | Bookbinder | C03B 37/014 |
| 2017/0371096 A1* | 12/2017 | Sakuma | C03B 37/01228 |
| 2019/0391323 A1* | 12/2019 | Miyabe | C03B 37/01446 |
| 2020/0393613 A1* | 12/2020 | Tamura | G02B 1/046 |

FOREIGN PATENT DOCUMENTS

| | | |
|---|---|---|
| JP | 2018-516386 A | 6/2018 |
| WO | WO-2016/007806 A1 | 1/2016 |
| WO | WO-2016/168042 A1 | 10/2016 |

OTHER PUBLICATIONS

Varnham, M. P. et al., "Thermal Stress Measurements in Optical-Fibre Preforms Using Preform-Profiling Techniques," Electronics Letters, 1984, vol. 20, No. 25/26, pp. 1034-1035.

\* cited by examiner

*Fig.2*

| SAMPLE No. | 1 | 2 | 3 | 4 | 5 |
|---|---|---|---|---|---|
| CORE Δ(%) | 0.1 | 0.15 | 0.22 | 0.28 | 0.18 |
| α VALUE OF CORE | 80 | 80 | 80 | 80 | 80 |
| DOPANT OF CORE | Cl | Cl | Cl | Cl | Cl |
| MASS FRACTION OF Cl IN CORE (%) | 1.0 | 1.5 | 2.2 | 2.8 | 1.8 |
| MASS FRACTION OF F IN CORE (%) | 0 | 0 | 0 | 0 | 0 |
| CORE OUTER DIAMETER (μm) | 8.2 | 8.3 | 8.2 | 8.3 | 8.3 |
| GLASS PART OUTER DIAMETER (μm) | 125 | 125 | 125 | 125 | 125 |
| DISPERSION@1550 nm (ps/nm/km) | 16.8 | 16.7 | 16.7 | 16.8 | 16.8 |
| MFD(μm) | 10.2 | 10.3 | 10.1 | 10.2 | 10.2 |
| $A_{eff}$(μm$^2$) | 81 | 82 | 80 | 81 | 81 |
| 22 m CABLE CUTOFF WAVELENGTH $\lambda_{cc}$ (μm) | 1.49 | 1.48 | 1.47 | 1.48 | 1.48 |
| MFD/$\lambda_{cc}$ | 6.8 | 7.0 | 6.9 | 6.9 | 6.9 |
| BENDING LOSS@1550 nm (dB/turn) (BENDING DIAMETER OF 30 mm) | 0.01 | 0.01 | 0.02 | 0.02 | 0.01 |
| BENDING LOSS@1550 nm (dB/turn) (BENDING DIAMETER OF 60 mm) | 0.001 | 0.001 | 0.001 | 0.001 | 0.001 |
| TRANSMISSION LOSS@1550 nm (dB/km) | 0.171 | 0.169 | 0.165 | 0.164 | 0.163 |
| DIFFERENCE BETWEEN MAXIMUM AND MINIMUM RESIDUAL STRESS (MPa) | 25 | 35 | 35 | 25 | 30 |
| MICRO-BENDING LOSS (dB/km) | 0.3 | 0.3 | 0.3 | 0.3 | 0.3 |
| PRIMARY THICKNESS (μm) | 33 | 33 | 33 | 33 | 33 |
| SECONDARY THICKNESS (μm) | 30 | 30 | 30 | 30 | 30 |
| PRIMARY YOUNG'S MODULUS (MPa) | 0.6 | 0.6 | 0.6 | 0.6 | 0.6 |
| SECONDARY YOUNG'S MODULUS (MPa) | 1200 | 1200 | 1200 | 1200 | 1200 |
| RATIO OF COATING THICKNESS | 1.1 | 1.1 | 1.1 | 1.1 | 1.1 |

Fig.4

| SAMPLE No. | 6 | 7 | 8 | 9 |
|---|---|---|---|---|
| CORE Δ(%) | 0.15 | 0.09 | 0.03 | -0.03 |
| α VALUE OF CORE | 80 | 80 | 80 | 80 |
| DOPANT OF CORE | Cl,F | Cl,F | Cl,F | Cl,F |
| MASS FRACTION OF Cl IN CORE (%) | 1.8 | 1.8 | 1.8 | 1.8 |
| MASS FRACTION OF F IN CORE (%) | 0.1 | 0.3 | 0.5 | 0.7 |
| CORE OUTER DIAMETER (μm) | 8.3 | 8.3 | 8.3 | 8.3 |
| GLASS PART OUTER DIAMETER (μm) | 125 | 125 | 125 | 125 |
| DISPERSION@1550 nm (ps/nm/km) | 16.8 | 16.5 | 16.7 | 16.8 |
| MFD(μm) | 10.2 | 10.3 | 10.3 | 10.2 |
| $A_{eff}(\mu m^2)$ | 81 | 83 | 82 | 81 |
| 22 m CABLE CUTOFF WAVELENGTH λcc (μm) | 1.48 | 1.47 | 1.49 | 1.48 |
| MFD/λcc | 6.9 | 7.0 | 6.9 | 6.9 |
| BENDING LOSS@1550 nm (dB/turn) (BENDING DIAMETER OF 30 mm) | 0.01 | 0.01 | 0.01 | 0.01 |
| BENDING LOSS@1550 nm (dB/turn) (BENDING DIAMETER OF 60 mm) | 0.001 | 0.001 | 0.001 | 0.001 |
| TRANSMISSION LOSS@1550 nm (dB/km) | 0.162 | 0.163 | 0.162 | 0.167 |
| DIFFERENCE BETWEEN MAXIMUM AND MINIMUM RESIDUAL STRESS (MPa) | 30 | 30 | 30 | 30 |
| MICRO-BENDING LOSS (dB/km) | 0.3 | 0.3 | 0.3 | 0.3 |
| PRIMARY THICKNESS (μm) | 33 | 33 | 33 | 33 |
| SECONDARY THICKNESS (μm) | 30 | 30 | 30 | 30 |
| PRIMARY YOUNG'S MODULUS (MPa) | 0.6 | 0.6 | 0.6 | 0.6 |
| SECONDARY YOUNG'S MODULUS (MPa) | 1200 | 1200 | 1200 | 1200 |
| RATIO OF COATING THICKNESS | 1.1 | 1.1 | 1.1 | 1.1 |
| INCREASE IN HYDROGEN LOSS (dB/km) | 0.002 | 0.002 | 0.002 | 0.002 |

Fig.6

| SAMPLE No. | 5 (REFERENCE) | 10 | 11 | 12 | 13 |
|---|---|---|---|---|---|
| CORE Δ(%) | 0.18 | 0.18 | 0.18 | 0.18 | 0.18 |
| α VALUE OF CORE | 80 | 80 | 80 | 80 | 80 |
| DOPANT OF CORE | Cl | Cl | Cl | Cl | Cl |
| MASS FRACTION OF Cl IN CORE (%) | 1.8 | 1.8 | 1.8 | 1.8 | 1.8 |
| MASS FRACTION OF F IN CORE (%) | 0 | 0 | 0 | 0 | 0 |
| CORE OUTER DIAMETER (μm) | 8.3 | 8.2 | 8.3 | 8.3 | 8.3 |
| GLASS PART OUTER DIAMETER (μm) | 125 | 125 | 125 | 125 | 125 |
| DISPERSION@1550 nm (ps/nm/km) | 16.8 | 16.8 | 16.8 | 16.8 | 16.8 |
| MFD(μm) | 10.2 | 10.2 | 10.2 | 10.2 | 10.2 |
| $A_{eff}$(μm$^2$) | 81 | 81 | 81 | 81 | 81 |
| 22 m CABLE CUTOFF WAVELENGTH $\lambda_{cc}$ (μm) | 1.48 | 1.49 | 1.49 | 1.49 | 1.49 |
| MFD/$\lambda_{cc}$ | 6.9 | 6.8 | 6.8 | 6.8 | 6.8 |
| BENDING LOSS@1550 nm (dB/turn) (BENDING DIAMETER OF 30 mm) | 0.01 | 0.02 | 0.02 | 0.02 | 0.02 |
| BENDING LOSS@1550 nm (dB/turn) (BENDING DIAMETER OF 60 mm) | 0.001 | 0.001 | 0.001 | 0.001 | 0.001 |
| TRANSMISSION LOSS@1550 nm (dB/km) | 0.163 | 0.164 | 0.167 | 0.169 | 0.178 |
| DIFFERENCE BETWEEN MAXIMUM AND MINIMUM RESIDUAL STRESS (MPa) | 30 | 70 | 130 | 180 | 250 |
| MICRO-BENDING LOSS (dB/km) | 0.3 | 0.4 | 0.3 | 0.4 | 0.4 |
| PRIMARY THICKNESS (μm) | 33 | 33 | 33 | 33 | 33 |
| SECONDARY THICKNESS (μm) | 30 | 30 | 30 | 30 | 30 |
| PRIMARY YOUNG'S MODULUS (MPa) | 0.6 | 0.6 | 0.6 | 0.6 | 0.6 |
| SECONDARY YOUNG'S MODULUS (MPa) | 1200 | 1200 | 1200 | 1200 | 1200 |
| RATIO OF COATING THICKNESS | 1.1 | 1.1 | 1.1 | 1.1 | 1.1 |

Fig.8

| SAMPLE No. | 5 (REFERENCE) | 14 | 15 | 16 |
|---|---|---|---|---|
| CORE Δ(%) | 0.18 | 0.18 | 0.18 | 0.18 |
| α VALUE OF CORE | 80 | 80 | 80 | 80 |
| DOPANT OF CORE | Cl | Cl | Cl | Cl |
| MASS FRACTION OF Cl IN CORE (%) | 1.8 | 1.8 | 1.8 | 1.8 |
| MASS FRACTION OF F IN CORE (%) | 0 | 0 | 0 | 0 |
| CORE OUTER DIAMETER (μm) | 8.3 | 10.6 | 12.3 | 13.4 |
| GLASS PART OUTER DIAMETER (μm) | 125 | 125 | 125 | 125 |
| DISPERSION@1550 nm (ps/nm/km) | 16.8 | 19.2 | 19.7 | 20.1 |
| MFD(μm) | 10.2 | 12.1 | 12.9 | 13.4 |
| Aeff(μm$^2$) | 81 | 113 | 134 | 151 |
| 22 m CABLE CUTOFF WAVELENGTH λcc (μm) | 1.48 | 1.47 | 1.49 | 1.49 |
| MFD/λcc | 6.9 | 8.2 | 8.7 | 9.0 |
| BENDING LOSS@1550 nm (dB/turn) (BENDING DIAMETER OF 30 mm) | 0.01 | 0.03 | 0.03 | 0.03 |
| BENDING LOSS@1550 nm (dB/turn) (BENDING DIAMETER OF 60 mm) | 0.001 | 0.002 | 0.002 | 0.002 |
| TRANSMISSION LOSS@1550 nm (dB/km) | 0.163 | 0.162 | 0.161 | 0.159 |
| DIFFERENCE BETWEEN MAXIMUM AND MINIMUM RESIDUAL STRESS (MPa) | 30 | 30 | 30 | 30 |
| MICRO-BENDING LOSS (dB/km) | 0.3 | 0.5 | 0.6 | 0.7 |
| PRIMARY THICKNESS (μm) | 33 | 33 | 33 | 33 |
| SECONDARY THICKNESS (μm) | 30 | 30 | 30 | 30 |
| PRIMARY YOUNG'S MODULUS (MPa) | 0.6 | 0.6 | 0.6 | 0.6 |
| SECONDARY YOUNG'S MODULUS (MPa) | 1200 | 1200 | 1200 | 1200 |
| RATIO OF COATING THICKNESS | 1.1 | 1.1 | 1.1 | 1.1 |

Fig.10

| SAMPLE No. | 5 (REFERENCE) | 17 | 18 | 19 | 20 | 21 | 22 | 23 |
|---|---|---|---|---|---|---|---|---|
| CORE Δ(%) | 0.18 | 0.18 | 0.18 | 0.18 | 0.18 | 0.18 | 0.18 | 0.18 |
| α VALUE OF CORE | 80 | 2 | 3 | 30 | 50 | 100 | 120 | 150 |
| DOPANT OF CORE | Cl | Cl | Cl | Cl | Cl | Cl | Cl | Cl |
| MASS FRACTION OF Cl IN CORE (%) | 1.8 | 1.8 | 1.8 | 1.8 | 1.8 | 1.8 | 1.8 | 1.8 |
| MASS FRACTION OF F IN CORE (%) | 0 | 0 | 0 | 0 | 0 | 0 | 0 | 0 |
| CORE OUTER DIAMETER (μm) | 8.3 | 8.2 | 8.3 | 8.4 | 8.4 | 8.4 | 8.4 | 8.4 |
| GLASS PART OUTER DIAMETER (μm) | 125 | 125 | 125 | 125 | 125 | 125 | 125 | 125 |
| DISPERSION@1550 nm (ps/nm/km) | 16.8 | 16.6 | 16.7 | 16.8 | 16.8 | 16.8 | 16.8 | 16.8 |
| MFD(μm) | 10.2 | 10.3 | 10.2 | 10.1 | 10.1 | 10.1 | 10.1 | 10.1 |
| $A_{eff}(\mu m^2)$ | 81 | 82 | 81 | 80 | 80 | 80 | 80 | 80 |
| 22 m CABLE CUTOFF WAVELENGTH $\lambda cc$ (μm) | 1.48 | 1.47 | 1.46 | 1.47 | 1.47 | 1.47 | 1.47 | 1.47 |
| MFD/$\lambda cc$ | 6.9 | 7.0 | 7.0 | 6.9 | 6.9 | 6.9 | 6.9 | 6.9 |
| BENDING LOSS@1550 nm (dB/turn) (BENDING DIAMETER OF 30 mm) | 0.01 | 0.01 | 0.01 | 0.01 | 0.01 | 0.01 | 0.01 | 0.01 |
| BENDING LOSS@1550 nm (dB/turn) (BENDING DIAMETER OF 60 mm) | 0.001 | 0.001 | 0.001 | 0.001 | 0.001 | 0.001 | 0.001 | 0.001 |
| TRANSMISSION LOSS@1550 nm (dB/km) | 0.163 | 0.179 | 0.174 | 0.169 | 0.166 | 0.169 | 0.174 | 0.178 |
| DIFFERENCE BETWEEN MAXIMUM AND MINIMUM RESIDUAL STRESS (MPa) | 30 | 30 | 30 | 30 | 30 | 30 | 30 | 30 |
| MICRO-BENDING LOSS (dB/km) | 0.3 | 0.3 | 0.3 | 0.3 | 0.3 | 0.3 | 0.3 | 0.3 |
| PRIMARY THICKNESS (μm) | 33 | 33 | 33 | 33 | 33 | 33 | 33 | 33 |
| SECONDARY THICKNESS (μm) | 30 | 30 | 30 | 30 | 30 | 30 | 30 | 30 |
| PRIMARY YOUNG'S MODULUS (MPa) | 0.6 | 0.6 | 0.6 | 0.6 | 0.6 | 0.6 | 0.6 | 0.6 |
| SECONDARY YOUNG'S MODULUS (MPa) | 1200 | 1200 | 1200 | 1200 | 1200 | 1200 | 1200 | 1200 |
| RATIO OF COATING THICKNESS | 1.1 | 1.1 | 1.1 | 1.1 | 1.1 | 1.1 | 1.1 | 1.1 |

*Fig.12*

| SAMPLE No. | 5 (REFER-ENCE) | 24 | 25 | 26 |
|---|---|---|---|---|
| CORE Δ(%) | 0.18 | 0.18 | 0.18 | 0.18 |
| α VALUE OF CORE | 80 | 80 | 80 | 80 |
| DOPANT OF CORE | Cl | Cl | Cl | Cl |
| MASS FRACTION OF Cl IN CORE (%) | 1.8 | 1.8 | 1.8 | 1.8 |
| MASS FRACTION OF F IN CORE (%) | 0 | 0 | 0 | 0 |
| CORE OUTER DIAMETER (μm) | 8.3 | 8.3 | 8.3 | 8.3 |
| GLASS PART OUTER DIAMETER (μm) | 125 | 125 | 125 | 125 |
| DISPERSION@1550 nm (ps/nm/km) | 16.8 | 16.8 | 16.8 | 16.8 |
| MFD(μm) | 10.2 | 10.2 | 10.2 | 10.2 |
| $A_{eff}$(μm$^2$) | 81 | 81 | 81 | 81 |
| 22 m CABLE CUTOFF WAVELENGTH $\lambda_{cc}$ (μm) | 1.48 | 1.48 | 1.48 | 1.48 |
| MFD/$\lambda_{cc}$ | 6.9 | 6.9 | 6.9 | 6.9 |
| BENDING LOSS@1550 nm (dB/turn) (BENDING DIAMETER OF 30 mm) | 0.01 | 0.01 | 0.01 | 0.01 |
| BENDING LOSS@1550 nm (dB/turn) (BENDING DIAMETER OF 60 mm) | 0.001 | 0.001 | 0.001 | 0.001 |
| TRANSMISSION LOSS@1550 nm (dB/km) | 0.163 | 0.162 | 0.168 | 0.171 |
| DIFFERENCE BETWEEN MAXIMUM AND MINIMUM RESIDUAL STRESS (MPa) | 30 | 30 | 30 | 30 |
| MICRO-BENDING LOSS (dB/km) | 0.3 | 0.3 | 0.3 | 0.3 |
| PRIMARY THICKNESS (μm) | 33 | 33 | 33 | 33 |
| SECONDARY THICKNESS (μm) | 30 | 30 | 30 | 30 |
| PRIMARY YOUNG'S MODULUS (MPa) | 0.6 | 0.6 | 0.6 | 0.6 |
| SECONDARY YOUNG'S MODULUS (MPa) | 1200 | 1200 | 1200 | 1200 |
| RATIO OF COATING THICKNESS | 1.1 | 1.1 | 1.1 | 1.1 |
| 55-62.5 AVERAGE VALUE OF RESIDUAL STRESS (55-62.5 AVERAGE VALUE) | -20 | -40 | -5 | 20 |
| 45-55 AVERAGE VALUE OF RESIDUAL STRESS (45-55 AVERAGE VALUE) | -10 | -10 | -10 | -10 |

Fig.14

| SAMPLE No. | 5 (REFERENCE) | 27 | 28 | 29 | 30 | 31 |
|---|---|---|---|---|---|---|
| CORE Δ(%) | 0.18 | 0.18 | 0.18 | 0.18 | 0.1 | 0.08 |
| α VALUE OF CORE | 80 | 80 | 80 | 80 | 80 | 80 |
| DOPANT OF CORE | Cl | Cl | Cl | Cl | Cl | Cl |
| MASS FRACTION OF Cl IN CORE (%) | 1.8 | 1.8 | 1.8 | 1.8 | 1.0 | 0.8 |
| MASS FRACTION OF F IN CORE (%) | 0 | 0 | 0 | 0 | 0 | 0 |
| CORE OUTER DIAMETER (μm) | 8.3 | 8.3 | 8.3 | 8.3 | 8.3 | 8.3 |
| GLASS OUTER DIAMETER (μm) | 125 | 125 | 125 | 125 | 125 | 125 |
| DISPERSION@1550 nm (ps/nm/km) | 16.8 | 16.8 | 16.8 | 16.8 | 16.8 | 16.8 |
| MFD(μm) | 10.2 | 10.2 | 10.2 | 10.2 | 10.2 | 10.2 |
| $A_{eff}$ (μm$^2$) | 81 | 81 | 81 | 81 | 81 | 81 |
| 22 m CABLE CUTOFF WAVELENGTH $\lambda_{cc}$ (μm) | 1.48 | 1.47 | 1.48 | 1.46 | 1.47 | 1.48 |
| MFD/$\lambda_{cc}$ | 6.9 | 6.9 | 6.9 | 7.0 | 6.9 | 6.9 |
| BENDING LOSS@1550 nm (dB/turn) (BENDING DIAMETER OF 30 mm) | 0.01 | 0.01 | 0.01 | 0.01 | 0.01 | 0.01 |
| BENDING LOSS@1550 nm (dB/turn) (BENDING DIAMETER OF 60 mm) | 0.001 | 0.001 | 0.001 | 0.001 | 0.001 | 0.001 |
| TRANSMISSION LOSS@1550 nm (dB/km) | 0.163 | 0.163 | 0.163 | 0.163 | 0.163 | 0.163 |
| DIFFERENCE BETWEEN MAXIMUM AND MINIMUM RESIDUAL STRESS (MPa) | 30 | 30 | 30 | 30 | 30 | 30 |
| MICRO-BENDING LOSS (dB/km) | 0.3 | 0.3 | 0.3 | 0.3 | 0.3 | 0.3 |
| PRIMARY THICKNESS (μm) | 33 | 33 | 33 | 33 | 33 | 33 |
| SECONDARY THICKNESS (μm) | 30 | 30 | 30 | 30 | 30 | 30 |
| PRIMARY YOUNG'S MODULUS (MPa) | 0.6 | 0.6 | 0.6 | 0.6 | 0.6 | 0.6 |
| SECONDARY YOUNG'S MODULUS (MPa) | 1200 | 1200 | 1200 | 1200 | 1200 | 1200 |
| RATIO OF COATING THICKNESS | 1.1 | 1.1 | 1.1 | 1.1 | 1.1 | 1.1 |
| INCREASE IN HYDROGEN LOSS (dB/km) | 0.002 | 0.01 | 0.008 | 0.002 | 0.004 | 0.008 |
| CORE AVERAGE FICTIVE TEMPERATURE (°C) | 1720 | 2180 | 2010 | 1720 | 1710 | 1720 |

Fig.15

| SAMPLE No. | 32 | 33 | 34 | 35 | 36 | 37 | 38 |
|---|---|---|---|---|---|---|---|
| CORE Δ(%) | 0.18 | 0.18 | 0.18 | 0.18 | 0.18 | 0.18 | 0.18 |
| α VALUE OF CORE | 80 | 80 | 80 | 80 | 80 | 80 | 80 |
| DOPANT OF CORE | Cl | Cl | Cl | Cl | Cl | Cl | Cl |
| MASS FRACTION OF Cl IN CORE (%) | 1.8 | 1.8 | 1.8 | 1.8 | 1.8 | 1.8 | 1.8 |
| MASS FRACTION OF F IN CORE (%) | 0 | 0 | 0 | 0 | 0 | 0 | 0 |
| CORE OUTER DIAMETER (μm) | 8.3 | 8.2 | 8.2 | 8.3 | 8.4 | 8.3 | 8.3 |
| GLASS OUTER DIAMETER (μm) | 125 | 125 | 125 | 125 | 125 | 125 | 125 |
| DISPERSION@1550 nm (ps/nm/km) | 16.8 | 16.8 | 16.8 | 16.8 | 16.8 | 16.8 | 16.8 |
| MFD(μm) | 10.2 | 10.2 | 10.2 | 10.2 | 10.2 | 10.2 | 10.2 |
| $A_{eff}$(μm$^2$) | 81 | 80 | 80 | 81 | 83 | 82 | 81 |
| 22 m CABLE CUTOFF WAVELENGTH λcc (μm) | 1.48 | 1.48 | 1.48 | 1.48 | 1.48 | 1.48 | 1.48 |
| MFD/λcc | 6.9 | 6.9 | 6.9 | 6.9 | 6.9 | 6.9 | 6.9 |
| BENDING LOSS@1550 nm (dB/turn) (BENDING DIAMETER OF 30 mm) | 0.01 | 0.01 | 0.01 | 0.01 | 0.01 | 0.01 | 0.01 |
| BENDING LOSS@1550 nm (dB/turn) (BENDING DIAMETER OF 60 mm) | 0.001 | 0.001 | 0.001 | 0.001 | 0.001 | 0.001 | 0.001 |
| TRANSMISSION LOSS@1550 nm (dB/km) | 0.163 | 0.163 | 0.163 | 0.163 | 0.163 | 0.163 | 0.163 |
| DIFFERENCE BETWEEN MAXIMUM AND MINIMUM RESIDUAL STRESS (MPa) | 30 | 30 | 30 | 30 | 30 | 30 | 30 |
| PRIMARY THICKNESS (μm) | 33 | 33 | 33 | 33 | 33 | 33 | 33 |
| SECONDARY THICKNESS (μm) | 30 | 30 | 30 | 30 | 30 | 30 | 30 |
| PRIMARY YOUNG'S MODULUS (MPa) | 0.05 | 0.05 | 0.05 | 0.05 | 0.3 | 0.5 | 0.7 |
| SECONDARY YOUNG'S MODULUS (MPa) | 300 | 500 | 1500 | 2500 | 1000 | 1000 | 1000 |
| RATIO OF COATING THICKNESS | 1.1 | 1.1 | 1.1 | 1.1 | 1.1 | 1.1 | 1.1 |
| MICRO-BENDING LOSS (dB/km) | 3 | 0.7 | 0.5 | 0.3 | 0.04 | 0.4 | 3 |

*Fig.16*

| SAMPLE No. | 39 | 40 | 41 |
|---|---|---|---|
| CORE Δ(%) | 0.18 | 0.18 | 0.18 |
| α VALUE OF CORE | 80 | 80 | 80 |
| DOPANT OF CORE | Cl | Cl | Cl |
| MASS FRACTION OF Cl IN CORE (%) | 1.8 | 1.8 | 1.8 |
| MASS FRACTION OF F IN CORE (%) | 0 | 0 | 0 |
| CORE OUTER DIAMETER (μm) | 8.2 | 8.3 | 8.3 |
| GLASS OUTER DIAMETER (μm) | 125 | 125 | 125 |
| DISPERSION@1550 nm (ps/nm/km) | 16.8 | 16.8 | 16.8 |
| MFD(μm) | 10.2 | 10.2 | 10.2 |
| $A_{eff}(\mu m^2)$ | 81 | 82 | 81 |
| 22 m CABLE CUTOFF WAVELENGTH λcc (μm) | 1.48 | 1.48 | 1.49 |
| MFD/λcc | 6.9 | 6.9 | 6.8 |
| BENDING LOSS@1550 nm (dB/turn) (BENDING DIAMETER OF 30 mm) | 0.01 | 0.01 | 0.01 |
| BENDING LOSS@1550 nm (dB/turn) (BENDING DIAMETER OF 60 mm) | 0.001 | 0.001 | 0.001 |
| TRANSMISSION LOSS@1550 nm (dB/km) | 0.163 | 0.163 | 0.163 |
| DIFFERENCE BETWEEN MAXIMUM AND MINIMUM RESIDUAL STRESS (MPa) | 30 | 30 | 30 |
| PRIMARY THICKNESS (μm) | 18 | 18 | 8 |
| SECONDARY THICKNESS (μm) | 20 | 10 | 30 |
| PRIMARY YOUNG'S MODULUS (MPa) | 0.05 | 0.05 | 0.05 |
| SECONDARY YOUNG'S MODULUS (MPa) | 1500 | 1500 | 1500 |
| RATIO OF COATING THICKNESS | 0.9 | 1.8 | 0.3 |
| MICRO-BENDING LOSS (dB/km) | 0.8 | 0.4 | 2 |

OPTICAL FIBER

TECHNICAL FIELD

The present disclosure relates to an optical fiber.

This application claims the priority of Japanese Patent Application No. 2020-028324 filed on Feb. 21, 2020, which is incorporated herein by reference in its entirety.

BACKGROUND ART

For example, an optical fiber made of silica-based glass and having a core doped with germanium (Ge) is known. In such an optical fiber having the Ge-doped core, Rayleigh scattering loss caused due to variations in concentration of Ge (variations from an average value) is large, and doping the core with Ge is becoming an impediment to reduce transmission loss. As a countermeasure, an optical fiber with a core not doped with Ge but a cladding doped with fluorine (F) is produced in order to reduce the loss, for example.

CITATION LIST

Patent Literature

Patent Document 1: WO 2016/007806 A1 Non-Patent Literature

Non-Patent Document 1: Libert et al, IWCS_Proceedings (1998) 375

Non-Patent Document 2: M. P. Varnham et al, Electron Lett 20, 1034 (1984)

SUMMARY OF INVENTION

Solution to Problem

An optical fiber of the present disclosure includes a glass part comprised of silica-based glass. The glass part includes a core having a central axis and a cladding surrounding the core. The core is doped with chlorine (Cl) with a mass fraction of 1% or more. The cladding has a refractive index lower than a maximum refractive index of the core. Further, residual stress is approximately uniform throughout a cross section of the glass part orthogonal to the central axis.

BRIEF DESCRIPTION OF DRAWINGS

FIG. 2 is a table showing the respective specifications of samples 1 to 5 of the optical fiber according to the embodiment of the present disclosure.

FIG. 4 is a table showing the respective specifications of samples 6 to 9 of the optical fiber according to the embodiment of the present disclosure.

FIG. 6 is a table showing the respective specifications of samples 10 to 13 of the optical fiber according to the embodiment of the present disclosure together with the specification of the sample 5 (for reference).

FIG. 8 is a table showing the respective specifications of samples 14 to 16 of the optical fiber according to the embodiment of the present disclosure together with the specification of the sample 5 (for reference).

FIG. 10 is a table showing the respective specifications of samples 17 to 23 of the optical fiber according to the embodiment of the present disclosure together with the specification of the sample 5 (for reference).

FIG. 12 is a table showing the respective specifications of samples 24 to 26 of the optical fiber according to the embodiment of the present disclosure together with the specification of the sample 5 (for reference).

FIG. 14 is a table showing the respective specifications of samples 27 to 31 of the optical fiber according to the embodiment of the present disclosure together with the specification of the sample 5 as a reference example.

FIG. 15 is a table showing the respective specifications of samples 32 to 38 of the optical fiber according to the embodiment of the present disclosure.

FIG. 16 is a table showing the respective specifications of samples 39 to 41 of the optical fiber according to the embodiment of the present disclosure.

DESCRIPTION OF EMBODIMENTS

Technical Problem

Figure 1:
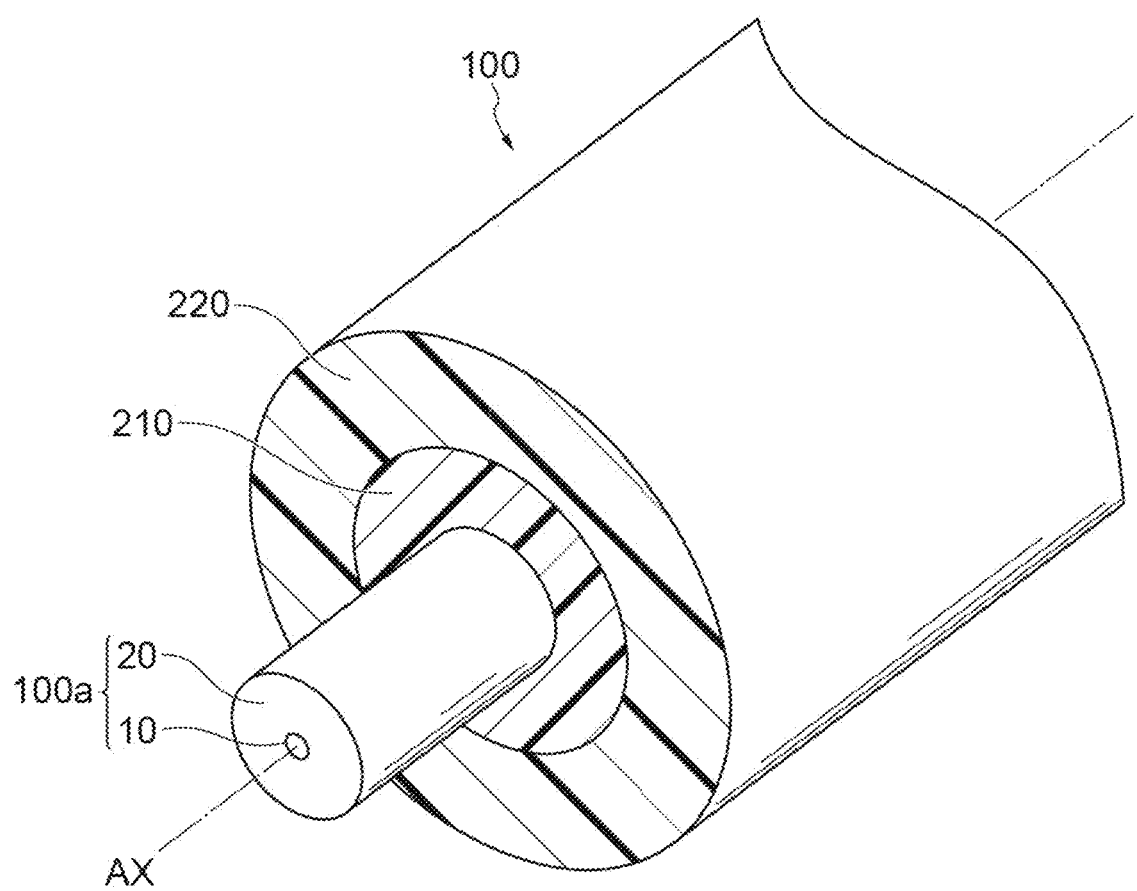
FIG. 1 is a diagram illustrating a cross-sectional structure of an optical fiber according to an embodiment of the present disclosure.

As a result of studying a conventional method for manufacturing an optical fiber preform, the inventors have found the following problems. That is, Patent Document 1 discloses that transmission loss can be reduced by setting viscosity of a core region (a region to be a core of an optical fiber after drawing) of a preform equal to or less than the viscosity of a cladding region (a region to be a cladding of the optical fiber after drawing) and further making the core region and the cladding region equal in the coefficient of thermal expansion (CTE) to each other. As disclosed in Patent Document 1, only bringing the values of the viscosity and the coefficient of thermal expansion close to each other between the core region and the cladding region in the preform is however insufficient to reduce the transmission loss. This is because stress remaining in a glass region is affected not only by properties of the preform such as the viscosity and the coefficient of thermal expansion but also by tension at the time of drawing, a drawing velocity, and a way of annealing.

The present disclosure has been made to solve the above-described problems, and it is therefore an object of the present disclosure to provide an optical fiber having a structure capable of reducing an increase in transmission loss.

Advantageous Effects of Invention

The optical fiber of the present disclosure can reduce transmission loss.

Description of Embodiment of Present Invention

First, details of the embodiment of the present disclosure will be individually listed and described.

(1) As one aspect, an optical fiber according to the embodiment of the present disclosure includes a glass part comprised of silica-based glass. The glass part includes a core having a central axis and a cladding surrounding the core. The core is doped with chlorine (Cl) with a mass fraction of 1% or more. The cladding has a refractive index lower than a maximum refractive index of the core. Further, residual stress is approximately uniform throughout a cross section of the glass part orthogonal to the central axis. Specifically, the "state where residual stress is approximately uniform" means a state where a difference between a maximum value and a minimum value of the residual stress is 230 MPa or less, or, 200 MPa or less, and as one aspect of the present disclosure, the difference between the maximum value and the minimum value of the residual stress is more preferably 100 MPa or less. Herein, the "residual stress" refers to axial stress σz described in Non-Patent Document 2. This is a component of stress applied to a cross section orthogonal to an AX direction in FIG. 1 in parallel to the AX direction, and is tensile stress when having a positive value and compressive stress when having a negative value.

As described above, the optical fiber having the core doped with Cl with a mass fraction of 1% or more can be made lower in loss than the optical fiber in the related art when the difference (absolute value) between the maximum value and the minimum value of the residual stress in the glass part is 230 MPa or less, or, 200 MPa or less. When the difference (absolute value) between the maximum value and the minimum value of the residual stress is 100 MPa or less, the effect of reducing the loss becomes more remarkable. This is considered to be because when the concentration of Cl is high, glass viscosity decreases, so that the Rayleigh scattering loss is easily reduced due to an annealing effect when the optical fiber (optical fiber after drawing) once heated in a drawing furnace is cooled.

(2) As an aspect of the present disclosure, the core may further contain fluorine (F). That is, doping with an appropriate amount of F makes the glass viscosity further lower, which brings about the effect of reducing the Rayleigh scattering loss.

(3) The mass fraction of chlorine with which the core is doped may be 1.5% or more. This makes the Rayleigh scattering loss further lower. However, as one aspect of the present disclosure, the mass fraction of chlorine with which the core is doped is preferably 5% or less, and more preferably 3% or less. Note that when the mass fraction of chlorine exceeds 5% (even 3% or more in some cases), air bubbles are generated at the time of doping with chlorine, which may make the production of an optical fiber preform difficult.

(4) As one aspect of the present embodiment, the optical fiber preferably has an effective area $A_{eff}$ of 70 μm² or more and 150 μm² or less. In this case, a sufficient reduction in transmission loss can be expected.

(5) As one aspect of the present disclosure, it is preferable that a refractive index profile of the core follows an α-index profile, and an α value determining a shape of the refractive index profile is 150 or less. This is because transmission loss significantly increases when the a value exceeds 150. Note that, as one aspect of the present disclosure, the α value is preferably 3 or more and 99 or less. The effect of reducing transmission loss is remarkable when the a value falls within a range of or more and 80 or less, but the α value within a range of 3 or more and 99 or less is practical.

(6) As one aspect of the present disclosure, in the cross section of the glass part, an average value of residual stress in a region where a distance from a center of the cross section in a radial direction is 50 μm or more and 62.5 μm or less is preferably lower than an average value of residual stress in a region where the distance from the center of the cross section in the radial direction is 45 μm or more and 55 pin or less. Satisfying the above relationship between such different regions brings about the effect of reducing the Rayleigh scattering loss.

(7) As one aspect of the present disclosure, the optical fiber preferably has micro-bending loss of 1 dB/km or less at a wavelength of 1550 nm. Adjusting the Young's modulus of a coating provided on an outer peripheral surface of the glass part makes the control of the micro-bending loss easy.

(8) As one aspect of the present disclosure, in the optical fiber after being exposed to a hydrogen atmosphere having a partial pressure of 1.5 kPa and a temperature of 25° C. for 720 hours, an increase in transmission loss is preferably 0.005 dB/km or less at a wavelength of 1550 nm. Making the fictive temperature low (for example, 2000° C. or lower) suppresses an increase in transmission loss after the hydrogen atmosphere treatment (reduces crystal defects in the glass structure).

As described above, each of the aspects listed in "Description of Embodiment of Present Disclosure" is applicable to each of all the remaining aspects or all combinations of the remaining aspects.

Details of Embodiment of Present Disclosure

Hereinafter, a specific structure of an optical fiber according to the embodiment of the present disclosure will be described in detail with reference to the accompanying drawings. It should be noted that the present invention is not limited to these examples, and is intended to be defined by the claims and to include all modifications within the scope of the claims and their equivalents. Further, in a description of the drawings, the same components are denoted by the same reference numerals, and a redundant description will be omitted.

FIG. 1 is a cross-sectional view of an example of a structure of an optical fiber according to the present disclosure. In FIG. 1, an optical fiber 100 includes a glass fiber (glass part) 100a comprised of silica-based glass, a primary coating 210 provided on an outer peripheral surface of the glass fiber 100a, and a secondary coating 220 provided on an outer peripheral surface of the primary coating 210. The glass fiber 100a includes a core 10 having a central axis (optical axis) AX and a cladding 20 provided on an outer peripheral surface of the core. The core 10 is doped with chlorine (Cl) with a mass fraction of 1% or more. Further, the cladding 20 may be doped with a suitable refractive index reducer such as F, and the cladding 20 has a refractive index set lower than a maximum refractive index of the core 10.

The primary coating 210 has a thickness (a width of the primary coating 210 in a radial direction orthogonal to a central axis AX) of 18 μm or more and 33 μm or less. Further, the primary coating 210 has a Young's modulus of 0.05 MPa or more and 0.6 MPa or less. On the other hand, the secondary coating 220 has a thickness of 20 μm or more and 30 μm or less. Further, the secondary coating 220 has a Young's modulus of 1200 MPa or more and 1500 MPa or less. Note that a ratio of the thickness of the primary coating 210 to the thickness of the secondary coating 220 ("primary thickness"/"secondary thickness") is 0.3 or more and 1.8 or less, and preferably 0.9 or more and 1.8 or less. In this case, micro-bending loss (dB/km) of the optical fiber 100 with the primary coating 210 and the secondary coating 220 provided can be controlled to fall within a proper range.

Hereinafter, results of evaluating samples 1 to 41 of the optical fiber 100 according to the present disclosure will be described with reference to FIGS. 2 to 16. First, as a prerequisite, specifications shown in FIGS. 2, 4, 6, 8, 10, 12, and 14 to 16 will be described. Note that the cladding of the optical fiber according to each sample is doped with F.

(1) "Core Δ(%)":
The item (1) is a maximum relative refractive index difference (%) of the core of each sample, with respect to a refractive index $n_0$ of pure silica glass. For example, a relative refractive index difference Δ of a part having a refractive index n is obtained by an expression of $(n/n_0)-1$.

(2) "α value of core":
The item (2) corresponds to an exponent of a defining equation of "α-index profile" described in Patent Document 1, and a profile shape of the core is expressed by the a value. That is, the refractive index profile of the core of each sample (change in relative refractive index difference in the radial direction orthogonal to the central axis AX) is expressed by the following defining equation of "α-index profile":

$$\Delta(r) = \Delta(r_0)\left(1 - \left[\frac{|r - r_0|}{(r_1 - r_0)}\right]^\alpha\right)$$

where:
r0 is a position where Δ(r) is maximum; and
r1 is fitted to an interface between the core and the cladding, and the exponent α value is determined by the least squares method.

(3) "Dopant of core":
The item (3) is an element with which the core of each sample is further doped in addition to Cl.

(4) "Mass fraction of Cl in core (%)":
The item (4) is a mass fraction (%) of chlorine (Cl) with which the core of each sample is doped. Note that, in order to measure the mass fraction of the element, a polished cross section of the optical fiber is measured in the radial direction from the central axis of the optical fiber using an electron probe micro analyzer (EPMA). Conditions of the measurement include, for example, an acceleration voltage of 20 kV, a probe beam diameter of 1 μm or less, and a measurement interval of 100 nm or less, and the mass fraction is obtained using a measurement value and a calibration curve obtained in advance.

(5) "Mass fraction of F in core (%)":
The item (5) is a mass fraction (%) of fluorine (F) with which the core of each sample is doped, and how to measure the mass fraction (%) is the same as in the item (4).

(6) "Core outer diameter (μm)":
The item (6) is an outer diameter (μm) of the core of each sample.

(7) "Glass part outer diameter (μm)":
The item (7) is an outer diameter (μm) of the glass part of each sample that corresponds the glass fiber 100a (a part including the core 10 and the cladding 20) illustrated in FIG. 1.

(8) "Dispersion@1550 nm (ps/nm/km)":
The item (8) is chromatic dispersion (ps/nm/km) of each sample at a wavelength of 1550 nm.

(9) "MFD (μm)":
The item (9) is a mode field diameter (μm) of each sample at a wavelength of 1550 nm.

(10) "$A_{eff}$ (μm$^2$)":
The item (10) is an effective area (μm$^2$) of each sample at a wavelength of 1550 nm.

Further,

(11) "22 in cable cutoff wavelength $\lambda_{cc}$ (μm)":
The item (11) is a cable cutoff wavelength (μm) defined by ITU-T G650.1.

(12) "MFD/$\lambda_{cc}$"
The item (12) is a ratio of "MFD" to "22 m cable cutoff wavelength $\lambda_{cc}$".

(13) "Bending loss@1550 nm (dB/turn) (bending diameter of 30 mm)":
The item (13) is an increase in loss (dB/turn) per turn measured when light having a wavelength of 1550 nm impinges on each sample wound around a mandrel having a diameter of 30 mm.

(14) "Bending loss@1550 nm (dB/turn) (bending diameter of 60 mm)":
The item (14) is an increase in loss (dB/turn) per turn measured when light having a wavelength of 1550 nm impinges on each sample wound around a mandrel having a diameter of 60 mm.

(15) "Transmission loss@1550 nm (dB/km)":
The item (15) is transmission loss (dB/km) of each sample at a wavelength of 1550 nm.

(16) "Difference between maximum and minimum residual stress (MPa)":
The item (16) is a numerical value (MPa) indicating a variation in residual stress throughout the cross section of the glass part of each sample (corresponding to the glass fiber 100a illustrated in FIG. 1).

(17) "Micro-bending loss (dB/km)":
The item (17) is micro-bending loss (dB/km) of each sample. Note that the micro-bending loss was evaluated with reference to Non-Patent Document 1. Specifically, the micro-bending loss is determined from an increase in loss when light having a wavelength of 1550 nm impinges on each sample of 500 in long wound around a drum having a body diameter of 405 mm with a tension of 80 gf, the drum having a mesh-like body surface formed by interlacing, at intervals of 100 μm, a metal wire having a cross-sectional diameter of 50 μm.

(18) "Primary thickness (μm)":
The item (18) is a thickness (μm) of the primary coating (corresponding to the primary coating 210 illustrated in FIG. 1) of each sample, i.e., a cross-sectional width of the primary coating in the radial direction.

(19) "Secondary thickness (μm)":
The item (19) is a thickness (μm) of the secondary coating (corresponding to the secondary coating 220 illustrated in FIG. 1) of each sample, i.e. the cross-sectional width of the secondary coating in the radial direction.

Further,

(20) "Primary Young's modulus (MPa)":

The item (20) is a Young's Modulus (MPa) of the primary coating of each sample.

(21) "Secondary Young's modulus (MPa)":

The item (21) is a Young's Modulus (MPa) of the secondary coating in each sample.

(22) "Ratio of coating thickness":

The item (22) is a ratio of the thickness of the primary coating to the thickness of the secondary coating of each sample ("primary thickness (μm)"/"secondary thickness (μm)").

(23) "Increase in hydrogen loss (dB/km)":

The item (23) is an increase in transmission loss (dB/km) at a wavelength of 1550 nm measured for each sample of the optical fiber exposed to a hydrogen atmosphere having a partial pressure of 1.5 kPa and a temperature of 25° C. for 720 hours.

(24) "55-62.5 average value of residual stress (55-62.5 average value)":

The item (24) is an average value (MPa) of residual stress in an annular region interposed between an inner peripheral part having a radius of 55 μm and an outer peripheral part having a radius of 62.5 μm in the cross section of each sample (cross section orthogonal to an axis corresponding to the central axis AX illustrated in FIG. 1).

(25) "45-55 average value of residual stress (45-55 average value)":

The item (25) is an average value (MPa) of residual stress in an annular region interposed between an inner peripheral part having a radius of 45 μm and an outer peripheral part having a radius of 55 μm in the cross section of each sample.

(26) "Core average fictive temperature (° C.)":

The item (26) is an average value of the fictive temperature (° C.) of the core of each sample.

Next, FIG. 2 is a table showing the respective specifications of the samples 1 to 5 prepared as the optical fiber according to the embodiment of the present disclosure. Further, FIG. 3 is a graph showing a relationship between the mass fraction (%) of chlorine (Cl) and the transmission loss (dB/km) for each of the samples 1 to 5.

Figure 3:
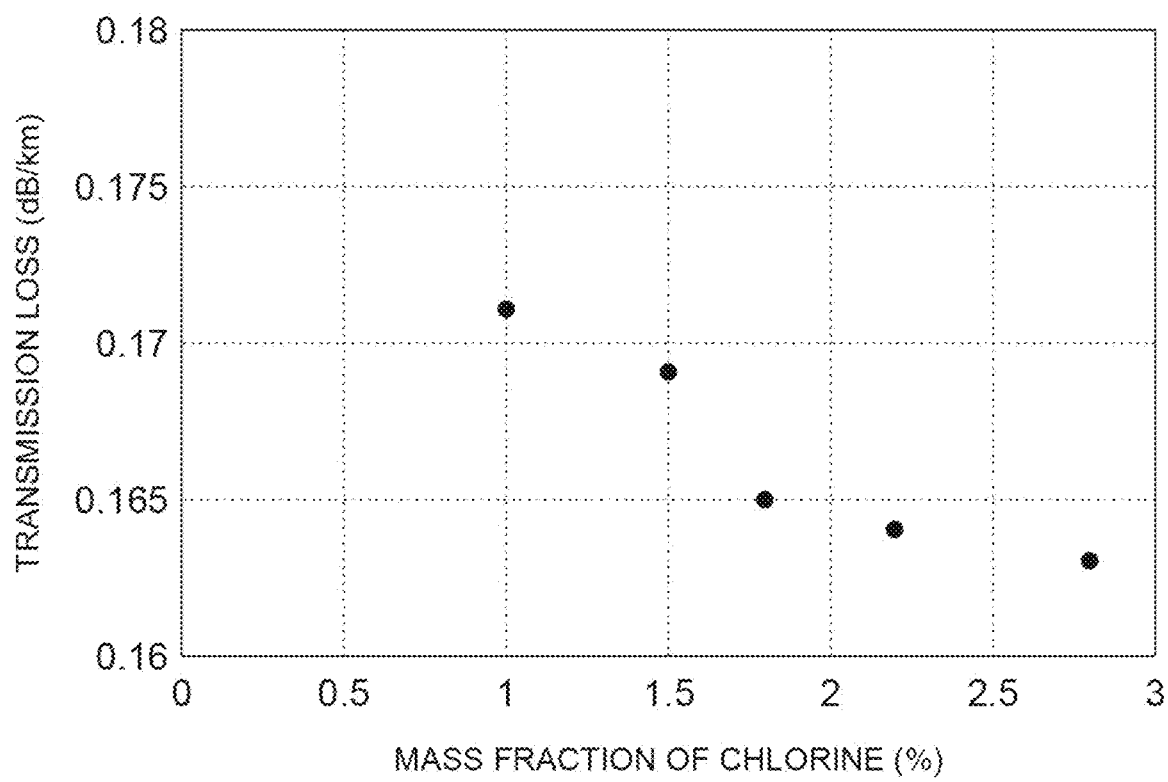
FIG. 3 is a graph showing a relationship between a mass fraction (%) of chlorine (Cl) and transmission loss (dB/km) for each of the samples 1 to 5.

As can be seen from the results of measuring the samples 1 to 5 shown in FIG. 3, the higher the concentration of chlorine (mass fraction of chlorine), the lower the transmission loss. This is considered to be because the higher the concentration of chlorine, the lower the glass viscosity. That is, this is considered to be because the Rayleigh scattering loss is easily reduced due to the effect of annealing a drawn optical fiber during a period from immediately after heating in a drawing furnace to cooling. Note that when the core is doped with Cl with a mass fraction higher than 3%, the production of the optical fiber preform tends to be difficult due to generation of air bubbles. It is therefore appropriate that the mass fraction of Cl with which the core is doped be 5% or less.

Figure 5:
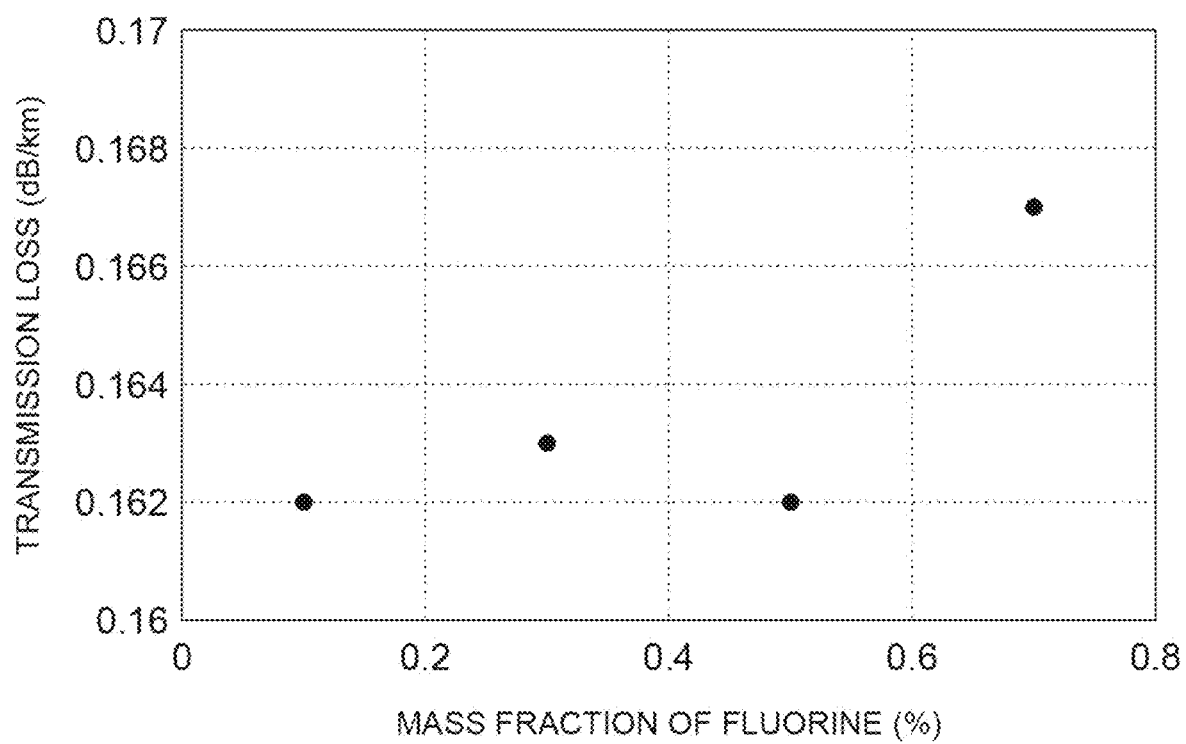
FIG. 5 is a graph showing a relationship between a mass fraction (%) of fluorine (F) and transmission loss (dB/km) for each of the samples 6 to 9.

FIG. 4 is a table showing the respective specifications of the samples 6 to 9 of the optical fiber according to the embodiment of the present disclosure. Further, FIG. 5 is a graph showing a relationship between the mass fraction (%) of fluorine (F) and the transmission loss (dB/km) for each of the samples 6 to 9. Note that the samples 6 to 9 are optical fibers having their respective cores doped with not only the same concentration of Cl but also F.

As can be seen from the results of measuring the samples 6 to 9 shown in FIG. 5, when the mass fraction of F is 0.5% or less, the transmission loss is almost the same, but when the mass fraction of F is or more, the transmission loss increases. The reason why the transmission loss hardly changes among the samples when the mass fraction of F is 0.5% or less (the samples 6 to 8) is considered to be because a reduction in the Rayleigh scattering loss due to a decrease in glass viscosity caused by doping with F and an increase in the Rayleigh scattering loss due to variations in concentration of F (deviations from a designed concentration distribution) are comparable. On the other hand, when the mass fraction of F is 0.5% or more (sample 9), the effect of reducing the Rayleigh scattering loss due to a decrease in glass viscosity starts to reach a level of saturation, and it is thus presumed that the amount of the increase in the Rayleigh scattering loss due to variations in concentration of F exceeds the amount of the reduction in the Rayleigh scattering loss due to a decrease in glass viscosity. Further, as a result of comparing the samples 5 to 8, a case where the core is doped with F may make the transmission loss lower than a case where the core is not doped with F. The mass fraction of F is required to be 0.1% or more.

Figure 7:
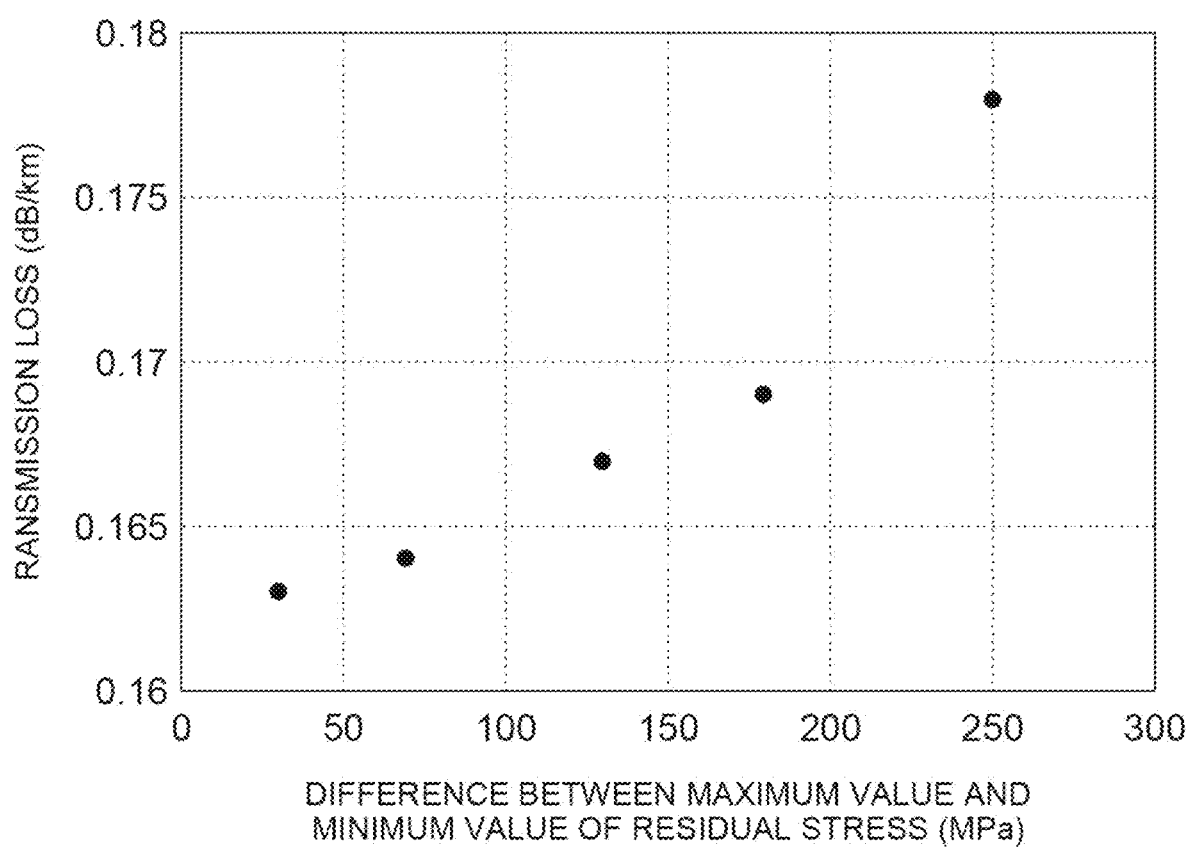
FIG. 7 is a graph showing a relationship between a difference (MPa) between a maximum value and a minimum value of residual stress and transmission loss (dB/km) for each of the samples 10 to 13 together with the sample 5 (for reference).

FIG. 6 is a table showing the respective specifications of the samples 10 to 13 of the optical fiber according to the embodiment of the present disclosure together with the specification of the sample 5 (for reference). FIG. 7 is a graph showing a relationship between the difference (MPa) between the maximum value and the minimum value of residual stress and the transmission loss (dB/km) for each of the samples 10 to 13 together with the sample 5 (for reference).

As can be seen from the result of measuring the sample 5 and the results of measuring the samples 10 to 13 shown in FIG. 7, the smaller the difference between the maximum residual stress and the minimum residual stress remaining throughout the cross section of each sample, the smaller the transmission loss. This is considered to be because the Rayleigh scattering loss changes due to a refractive index difference caused by strain inside each sample (optical fiber), particularly in the glass part.

FIG. 8 is a table showing the respective specifications of the samples 14 to 16 of the optical fiber according to the embodiment of the present disclosure together with the specification of the sample 5 (for reference). Further, FIG. 9 is a graph showing a relationship between the effective area $A_{eff}$ (μm$^2$) and the transmission loss (dB/km) for each of the samples 14 to 16 together with the sample 5 (for reference).

Figure 9:
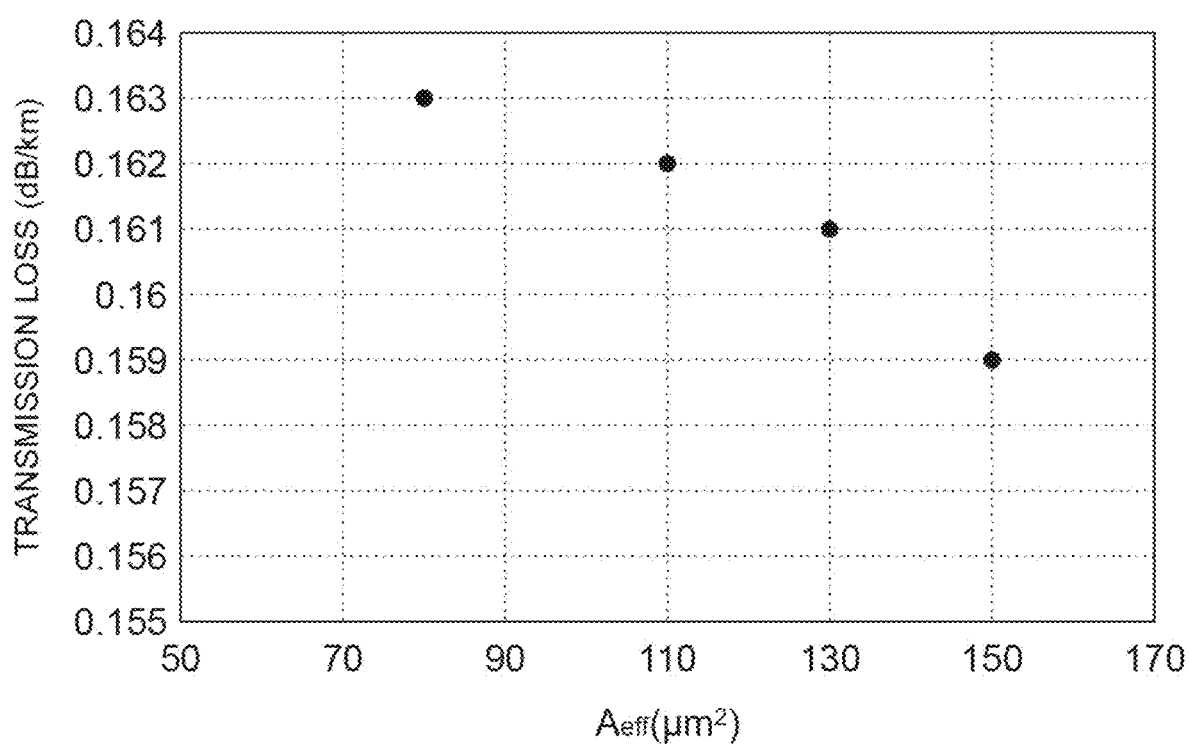
FIG. 9 is a graph illustrating a relationship between an effective area $A_{eff}$ ($\mu m^2$) and transmission loss (dB/km) for each of the samples 14 to 16 together with the sample 5 (for reference).

As can be seen from the result of measuring the sample 5 and the results of measuring the sample 14 to 16 shown in FIG. 9, the larger the effective area $A_{eff}$, the smaller the transmission loss. This is considered to be because when the concentration of F in the cladding of each sample decreases due to an increase in the effective area $A_{eff}$, loss caused by Rayleigh scattering due to variations in the concentration of F given to cladding mode light is reduced.

FIG. 10 is a table showing the respective specifications of the samples 17 to 23 of the optical fiber according to the embodiment of the present disclosure together with the specification of the sample 5 (for reference). Further, FIG. 11 is a graph showing a relationship between the α value and the transmission loss (dB/km) for each of the samples 17 to 23 together with the sample 5 (for reference).

Figure 11:
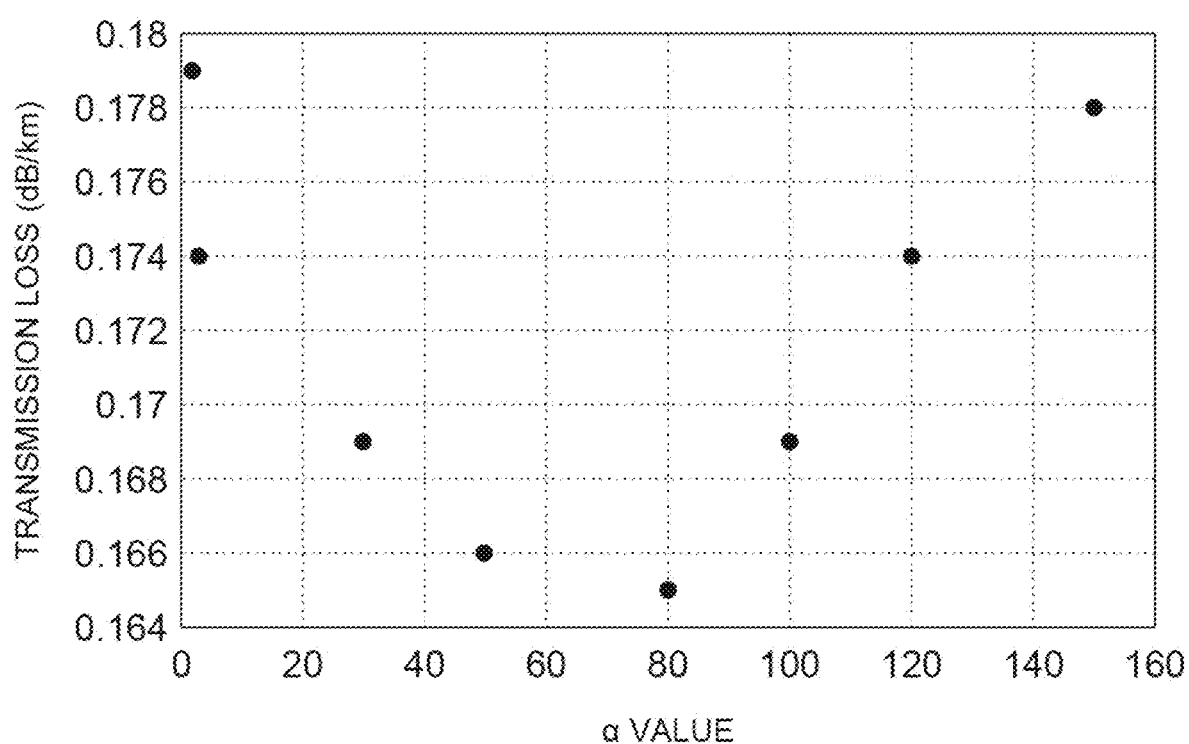
FIG. 11 is a graph showing a relationship between an $\alpha$ value and transmission loss (dB/km) for each of the samples 17 to 23 together with the sample 5 (for reference).

As can be seen from the result of measuring the sample 5 and the results of measuring the samples 17 to 23 shown in FIG. 11, the transmission loss is most reduced when the α value falls within a range of 60 or more and 80 or less. In both a case where the a value is smaller than the range and a case where the α value is larger than the range, the transmission loss tends to increase. An increase in the transmission loss when the α value decreases is considered to be caused by an increase in the glass viscosity at the outer peripheral part of the core because the concentration of Cl at the outer peripheral part of the core decreases. That is, it is considered to be because the Rayleigh scattering loss increases due to the increase in the glass viscosity at the outer peripheral part of the core. On the other hand, the reason why the transmission loss increases when the a value increases is not clear, but it can be presumed that generation of micro-air bubbles near the interface between the core and the cladding due to, for example, an increase in the concentration of Cl at the interface is a factor. That is, a phenomenon in which the Rayleigh scattering loss increases due to the interface mismatch is presumed to cause the increase in the transmission loss. Note that, during the drawing of each sample, the sample drawn out from the drawing furnace was annealed using a heat-retaining furnace. The temperature of the heat-retaining furnace is different for each sample.

Figure 13:
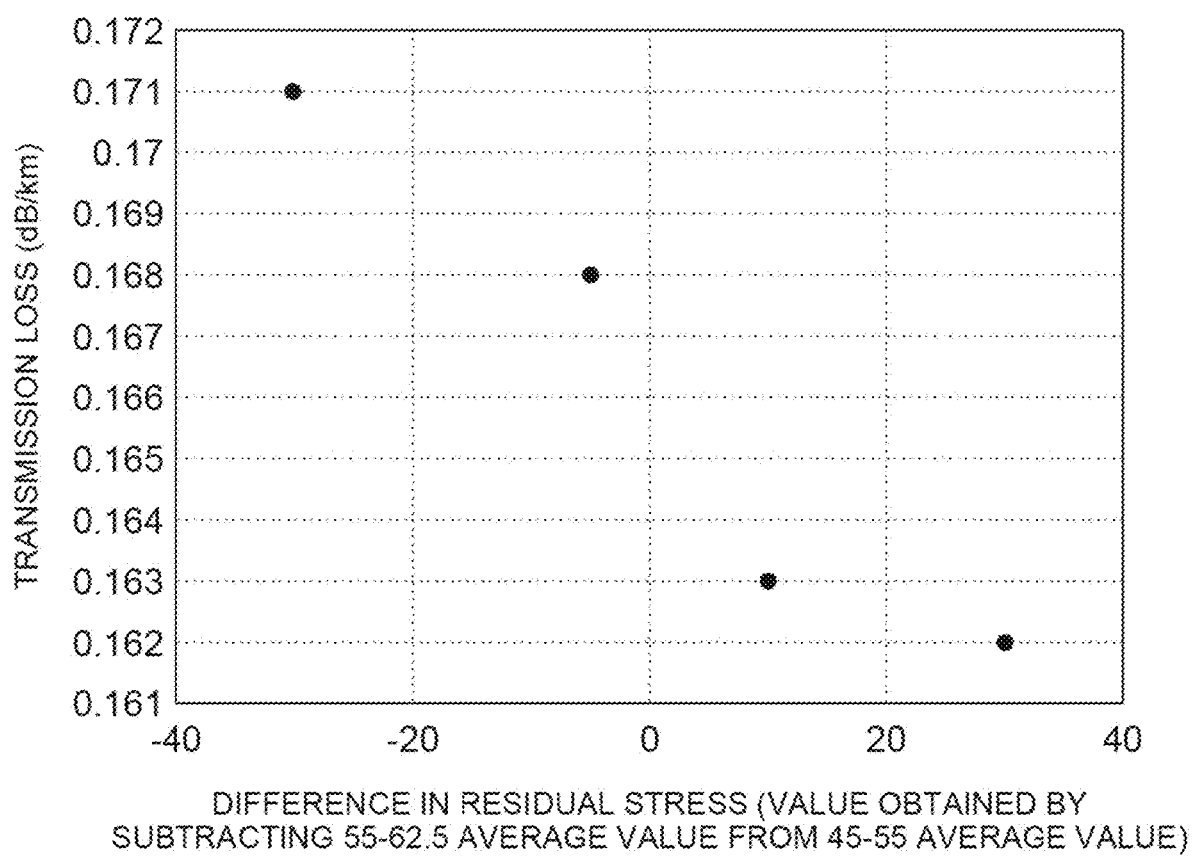
FIG. 13 is a graph showing a relationship between a difference (MPa) in residual stress between specific parts and transmission loss (dB/km) for each of the samples 24 to 26 together with the sample 5 (for reference).

FIG. 12 is a table showing the respective specifications of the samples 24 to 26 of the optical fiber according to the embodiment of the present disclosure together with the specification of the sample 5 (for reference). FIG. 13 is a graph showing a relationship between the difference (MPa) in residual stress between specific parts and the transmission loss (dB/km) for each of the samples 24 to 26 together with the sample 5 (for reference). Note that the "difference in residual stress between specific parts" is a difference value obtained by subtracting an average value (55-62.5 average value) of residual stress in a region where a distance from a center of the cross section in the radial direction is 55 μm or more and 62.5 μm or less from an average value (45-55 average value) of residual stress in a region where the distance from the center of the cross section in the radial direction is 45 pin or more and 55 μm or less.

As can be seen from the result of measuring the sample 5 and the results of measuring the sample 24 to 26 shown in FIG. 13, the larger the difference value, the smaller the transmission loss. Specifically, the difference value defined as "(45-55 average value)−(55-62.5 average value)" is preferably 20 MPa or more. When stress in a compression direction is applied to an outermost peripheral part having a "glass part outer diameter" of 110 μm or more and 130 μm or less (a radius of 55 μm or more and 62.5 μm or less), tensile stress remains in the cladding, and as a result, compressive stress remains in the core where optical power is concentrated. It can be presumed that such a situation causes a reduction in the Rayleigh scattering loss.

Subsequently, for each sample after being exposed to a hydrogen atmosphere having a partial pressure of 1.5 kPa and a temperature of 25° C. for 720 hours, an increase in transmission loss (increase in hydrogen loss) at a wavelength of 1550 nm was evaluated. FIG. 14 is a table showing the respective specifications of the samples 27 to 31 of the optical fiber according to the embodiment of the present disclosure together with the specification of the sample 5 (for reference).

For the sample 5 and the samples 27 to 31 shown in FIG. 14, the lower the fictive temperature, the smaller the increase in the hydrogen loss (increase in the transmission loss in hydrogen characteristic evaluation). This is considered to be because the lower the fictive temperature, the fewer defects are in the glass structure. Further, as a result of comparing the sample 5, the sample 30, and the sample 31, the higher the concentration of Cl in the core, the smaller the increase in the hydrogen loss. This is considered to be because the lower the concentration of Cl, the more defects are in the glass structure. Therefore, in order to make the increase in the hydrogen loss 0.008 dB/km or less, it is at least necessary that the fictive temperature be 2000° C. or less and the mass fraction of Cl be 1% or more.

FIG. 15 is a table showing the respective specifications of the samples 32 to 38 of the optical fiber according to the embodiment of the present disclosure. In FIG. 15, micro-bending loss (micro-bending loss measured with both the primary coating and the secondary coating provided) of each of the samples 32 to 38 is additionally shown.

From the table shown in FIG. 15, as a result of comparing the samples 32 to 38, the "primary thickness" that is the thickness of the primary coating and the "secondary thickness" that is the thickness of the secondary coating are comparable, and a relationship between their respective Young's moduli and the micro-bending loss is obtained. When the "primary Young's modulus" that is the Young's modulus of the primary coating is greater than 0.5 MPa and the "secondary Young's modulus" that is the Young's modulus of the secondary coating is greater than 500 MPa, the micro-bending loss may be made 1 dB/km or less.

FIG. 16 is a table showing the respective specifications of the samples 39 to 41 of the optical fiber according to the embodiment of the present disclosure. As a result of comparing the samples 39 to 41 in which the Young's modulus of the primary coating and the Young's modulus of the secondary coating are fixed, and their respective coatings are different in thickness as shown in FIG. 16, when the outer diameter of the primary coating is smaller than 160 μm (the sample 39: 161 μm, the sample 40: 161 μm, the sample 41: 141 μm), the micro-bending loss is greater than 1 dB/km. Further, when the outer diameter of the secondary coating is greater than 200 μm (the sample 39: 201 μm, the sample 40: 181 μm, the sample 41: 201 μm), the micro-bending loss is greater than 1 dB/km. As a result of comparing the samples 39 to 41, the micro-bending loss can be reduced when the "ratio of coating thickness" is greater than 0.3.

REFERENCE SIGNS LIST 10 core
20 cladding
100 optical fiber
100a glass fiber (glass part)
210 primary coating
220 secondary coating

The invention claimed is:
1. An optical fiber comprising:
a glass part extending in a direction of a central axis, wherein
the glass part is comprised of silica-based glass, includes a core and a cladding, and has residual stress approximately uniform throughout a cross section of the glass part orthogonal to the central axis, the core having the central axis and being doped with chlorine having a mass fraction of 1%, or more, the cladding surrounding the core and having a refractive index lower than a maximum refractive index of the core,
in the cross section of the glass part, an average value of residual stress in a region where a distance from a center of the cross section in a radial direction is 50 μm or more and 62.5 μm or less is lower than an average value of residual stress in a region where the distance from the center of the cross section in the radial direction is 45 μm or more and 55 μm or less, and the average value of residual stress in the region where the distance from the center of the cross section in the radial direction is 45 μm or more and 55 μm or less is negative, whereby the greater a value obtained by subtracting the average value of residual stress in the region where the distance from the center of the cross section in the radial direction is 55 μm or more and 62.5 μm or less from the average value of residual stress in the region where the distance from the center of the cross section in the radial direction is 45 μm or more and 55 μm or less, the lower a transmission loss.

2. The optical fiber according to claim 1, wherein a difference between a maximum value and a minimum value of the residual stress is 200 MPa or less.

3. The optical fiber according to claim 2, wherein the difference between the maximum value and the minimum value of the residual stress is 100 MPa or less.

4. The optical fiber according to claim 1, wherein the core further contains fluorine.

5. The optical fiber according to claim 4, wherein a mass fraction of the fluorine in the core is 0.1% or more.

6. The optical fiber according to claim 4, wherein a mass fraction of the fluorine in the core is 0.5% or less.

7. The optical fiber according to claim 1, wherein the mass fraction of the chlorine in the core is 1.5% or more.

8. The optical fiber according to claim 1, wherein the mass fraction of the chlorine in the core is 3% or less.

9. The optical fiber according to claim 1, having an effective area of 70 μm$^2$ or more and 150 μm$^2$ or less.

10. The optical fiber according to claim 1, wherein an α value determining a shape of a refractive index profile of the core is 150 or less.

11. The optical fiber according to claim 10, wherein the α value is 3 or more and 99 or less.

12. The optical fiber according to claim 1, wherein
in the cross section of the glass part, the value obtained by subtracting the average value of residual stress in the region where the distance from the center of the cross section in the radial direction is 55 μm or more and 62.5 μm or less from the average value of residual stress in the region where the distance from the center of the cross section in the radial direction is 45 μm or more and 55 μm or less is greater than 20 MPa.

13. The optical fiber according to claim 1, having microbending loss of 1 dB/km or less at a wavelength of 1550 nm.

14. The optical fiber according to claim 1, wherein
in the optical fiber after being exposed to a hydrogen atmosphere having a partial pressure of 1.5 kPa and a temperature of 25° C. for 720 hours, an increase in transmission loss is 0.005 dB/km or less at a wavelength of 1550 nm.

* * * * *